US011317420B2

(12) United States Patent
Kim et al.

(10) Patent No.: US 11,317,420 B2
(45) Date of Patent: Apr. 26, 2022

(54) RESOURCE QUERY PROCESSING

(71) Applicant: IDAC HOLDINGS, INC., Wilmington, DE (US)

(72) Inventors: Sung-Yeon Kim, Dongjak-gu (KR); Dirk Trossen, London (GB)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/641,021

(22) PCT Filed: Aug. 30, 2018

(86) PCT No.: PCT/US2018/048902
§ 371 (c)(1),
(2) Date: Feb. 21, 2020

(87) PCT Pub. No.: WO2019/046609
PCT Pub. Date: Mar. 7, 2019

(65) Prior Publication Data
US 2020/0288480 A1 Sep. 10, 2020

Related U.S. Application Data

(60) Provisional application No. 62/551,964, filed on Aug. 30, 2017.

(51) Int. Cl.
*H04L 12/46* (2006.01)
*H04L 29/12* (2006.01)
(Continued)

(52) U.S. Cl.
CPC ........... *H04W 72/06* (2013.01); *H04L 12/189* (2013.01); *H04W 72/048* (2013.01); *H04W 72/10* (2013.01)

(58) Field of Classification Search
None
See application file for complete search history.

(56) References Cited

U.S. PATENT DOCUMENTS

2014/0019417 A1* 1/2014 Oh ..................... H04L 67/02
707/653
2017/0034217 A1* 2/2017 Anton ................. G06F 21/6227
(Continued)

FOREIGN PATENT DOCUMENTS

CN    102714654 A    10/2012
CN    106940696 A    7/2017
(Continued)

OTHER PUBLICATIONS

Castellani et al., "Guidelines for Mapping Implementations: HTTP to the Constrained Application Protocol (CoAP)", Internet Engineering Task Force (IETF), Request for Comments: 8075, Feb. 2017, pp. 1-40.

(Continued)

*Primary Examiner* — Ajit Patel
(74) *Attorney, Agent, or Firm* — Condo Roccia Koptiw LLP

(57) ABSTRACT

A device may be configured to receive, process, forward, and/or respond to one or more resource queries. For example, the device may determine whether multiple queries are satisfied by a multicast response. The device may receive a first query and a second query directed to a resource, The first and the second query may comprise a structure proxy rule identifier (sPRID). The device may determine the similarity between the two queries. For example, the similarity determination may be based on the sPRID of the two queries. The device may determine whether a response that satisfies the first query also satisfies the second query, which may be based on a response to the first query and information comprised within the sPRID of (Continued)

the two queries. If the response satisfies both queries, the device may multicast the response.

16 Claims, 11 Drawing Sheets

(51) Int. Cl.
*H04W 72/06* (2009.01)
*H04L 12/18* (2006.01)
*H04W 72/04* (2009.01)
*H04W 72/10* (2009.01)

(56) References Cited

U.S. PATENT DOCUMENTS

| | | | |
|---|---|---|---|
| 2018/0227390 A1* | 8/2018 | Reznik | H04L 67/2842 |
| 2018/0248851 A1* | 8/2018 | Kaplan Haelion | H04L 61/2015 |
| 2018/0270300 A1* | 9/2018 | Reznik | H04L 65/4084 |
| 2018/0324091 A1* | 11/2018 | Dong | H04L 45/54 |
| 2019/0199540 A1* | 6/2019 | Robitzsch | H04L 67/28 |
| 2019/0230167 A1* | 7/2019 | Laari | H04L 41/12 |
| 2019/0238617 A1* | 8/2019 | Novo Diaz | H04L 67/1076 |
| 2020/0036792 A1* | 1/2020 | Palin | H04L 67/12 |

FOREIGN PATENT DOCUMENTS

| | | |
|---|---|---|
| WO | WO 2016-123516 A1 | 8/2016 |
| WO | WO 2017-004508 A1 | 1/2017 |
| WO | WO 2018-006042 A1 | 1/2018 |

OTHER PUBLICATIONS

Fielding, et al., "Hypertext Transfer Protocol (HTTP/1.1): Semantics and Content", Internet Engineering Task Force (IETF), Request for Comments: 7231, Jun. 2014, pp. 1-101.
Fotiou et al., "CoAP over ICN", arXiv:1707.03233v1, Athens University of Economics and Business, Jul. 11, 2017, 4 pages.
Islam et al., "Observing IoT Resources over ICN", arXiv:1707.03394v2, Department of Computer Science, Aalto University, Espoo, Finland, Jul. 19, 2017, 8 pages.
Shelby et al., "The Constrained Application Protocol (CoAP)", Internet Engineering Task Force (IETF), Request for Comments: 7252, Jun. 2014, pp. 1-112.

* cited by examiner

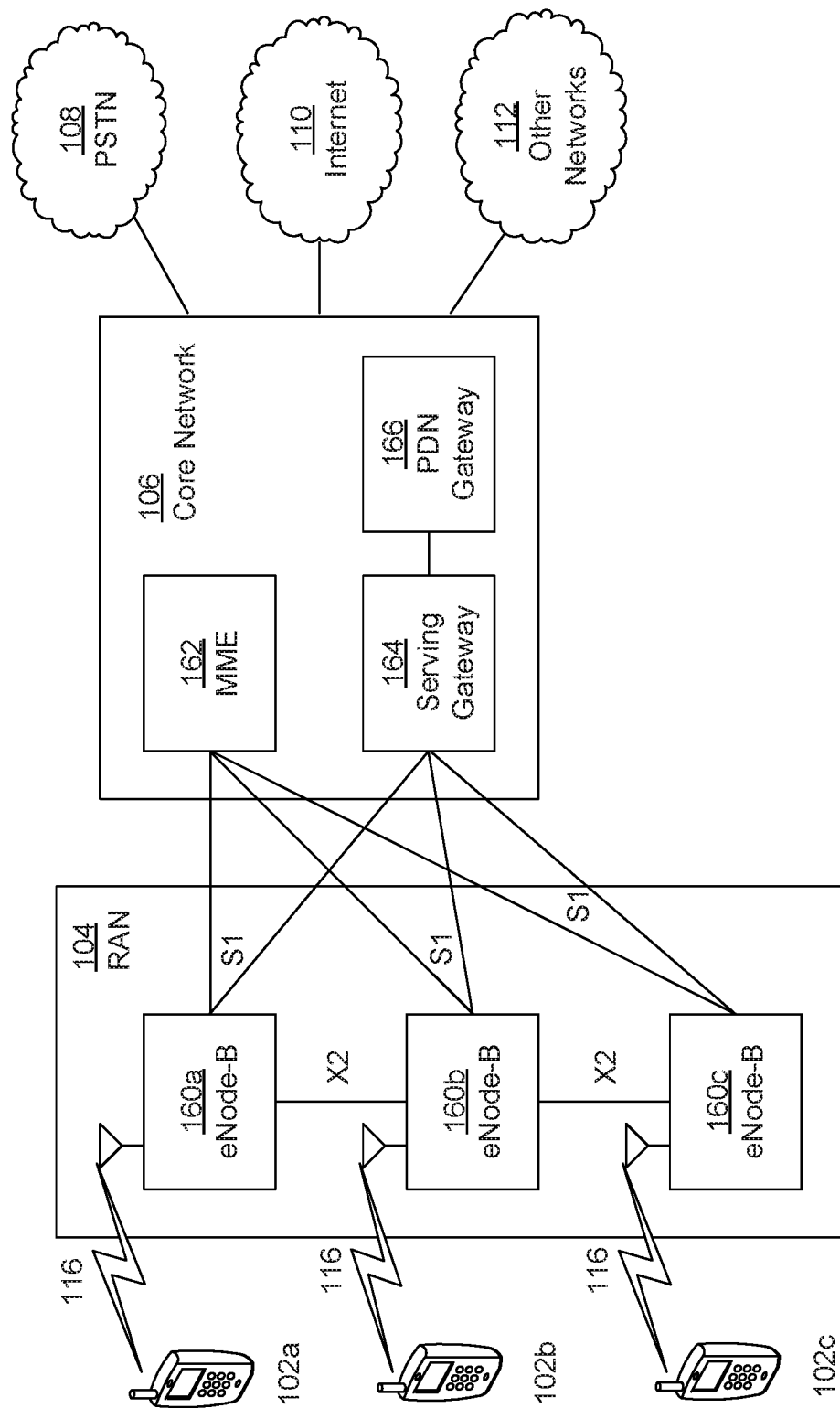

RESOURCE QUERY PROCESSING

CROSS-REFERENCE

This is the National Stage Entry under 35 U.S.C. § 371 of Patent Cooperation Treaty Application No. PCT/US2018/048902, filed Aug. 30, 2018, which application claims the benefit of U.S Provisional Application No. 62/551,964, filed Aug. 30, 2017 the contents of which are incorporated by reference herein.

BACKGROUND

In a network environment, various resources may be accessible to client devices. For example, client devices may query resources such as hardware devices, data sources, on-line services, etc. Client requests are transmitted over networks to the relevant resource. For example, a client device may generate and transmit a query directed to a particular resource, such as, for example, a sensor device. Information responsive to the query may be determined by the resource device and forwarded to the client device from which the request was made.

Multiple client devices may transmit queries to the same resource. In some instances, the information responsive to the multiple queries may be the same or similar. For example, three separate client devices may transmit to a sensor device separate queries that seek, or may be responded to, with the same responsive information. However, the sensor device may generate three separate messages, each responsive to one of the client devices.

SUMMARY

A device may be configured to receive, process, forward, and/or respond to one or more resource requests. For example, the device may determine whether multiple queries are satisfied by a multicast response. The device may receive a first query and a second query directed to a resource. The first query and the second query may each comprise a structure proxy rule identifier (sPRID). The device may determine a similarity between the first query and the second query. For example, the similarity determination may be based on the sPRID of the first query and the sPRID of the second query. The device may determine whether a response that satisfies the first query also satisfies the second query. The response to the second query may be based on the response to the first query, information included in the sPRID of the first query, and/or information included within the second query. If the response to the first query satisfies both the first query and the second query, the device may multicast the response to the first query.

The device may be configured to generate a multicast group identifier (MGID), which may be used to determine the similarity between queries. For example, a MGID may be generated based on a uniform resource identifier (URI) and a query type for a query. The URI and the query type may be extracted from the sPRID of the query. The MGIDs of one or more queries may be compared to determine the similarity between the queries. If, for example, the MGID of the queries are the same, the queries may be determined to be similar. If, however, the MGID of the queries are not the same, the queries may be determined not to be similar.

The device may determine whether to include a query having the same MGID in a multicast group associated with the MGID or a unicast group associated with the MGID. A multicast response may be transmitted to the queries in the multicast group associated with the MGID. The determination of whether to include a query in the multicast group or the unicast group may be based on information extracted from the sPRID of the query and/or a response to the query. For example, the information extracted from the sPRID of the query may include a uniform resource identifier (URI) that the query is directed to and/or a query type associated with the query.

A device may generate an sPRID for a query and may be attached to the query. The sPRID may include a concatenation of information associated with the query. For example, the sPRID may include a concatenation of: a hash of the URI where the query is directed to, a query type, a query operation, a query value, and the like. The query may be updated to include the sPRID. For example, the sPRID may be encoded in a protocol header associated with the query. For example, an ICN header and/or an HTTP If-None-Match header may be encoded in a protocol header.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and methods are not limited to those depicted.

FIG. 1C is a system diagram illustrating an example radio access network (RAN) and an example core network (CN) that may be used within the communications system illustrated in FIG. 1A according to an embodiment;

DETAILED DESCRIPTION OF ILLUSTRATIVE EMBODIMENTS

Disclosed herein are systems and methods for identifying requests to query network resources that may be satisfied by resource response values that may be similar and may be responded to using a multicast response. In an example embodiment, one or more request (e.g. each of a plurality of requests) to query a network resource may be processed to generate structured information corresponding to the URI of the network resource and details of the requested query. A request (e.g. each request), along with the corresponding structured information may be communicated to a network access point adapted to provide access to the requested resource. The network access point may determine, using a portion of the structured information, that one or more requests may be grouped together as being satisfied by a resource response value (e.g. the same resource response value). At least one of the requests may be forwarded to the network resource for processing. Upon receipt of a resource response value from the network resource, the network access point may use the response value to evaluate a request (e.g. each of the requests) identified as potentially being grouped together as being satisfied by the same response value. In an example embodiment, for a request (e.g. each request) that was identified as possibly being grouped together, the network access point may use information regarding the query associated with the request to determine whether the query is satisfied by the received resource response value. If so, the request may be identified as belonging to the group. For those requests determined to be associated with the group, a multicast response message may be generated and transmitted.

Figure 1A:
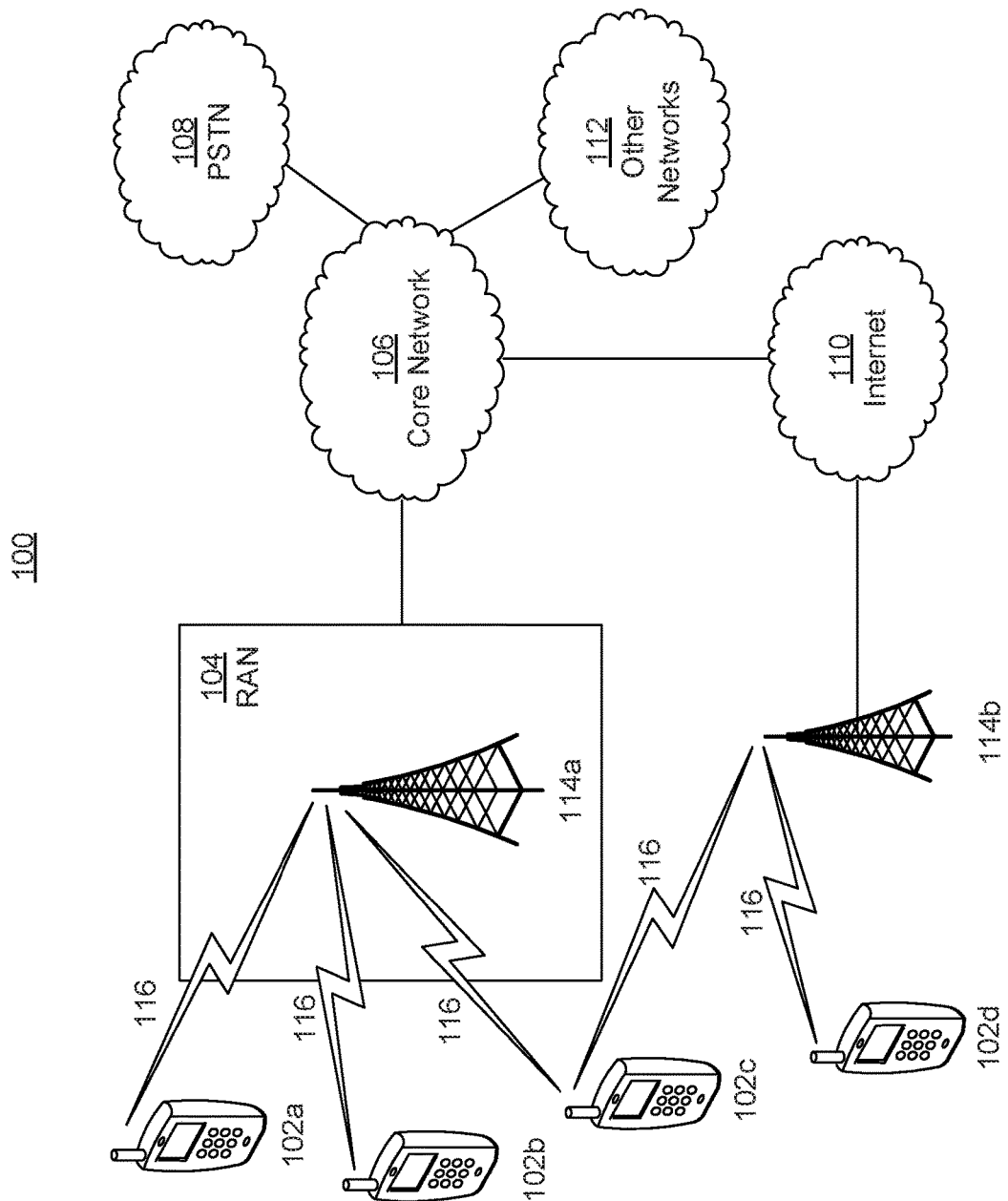
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
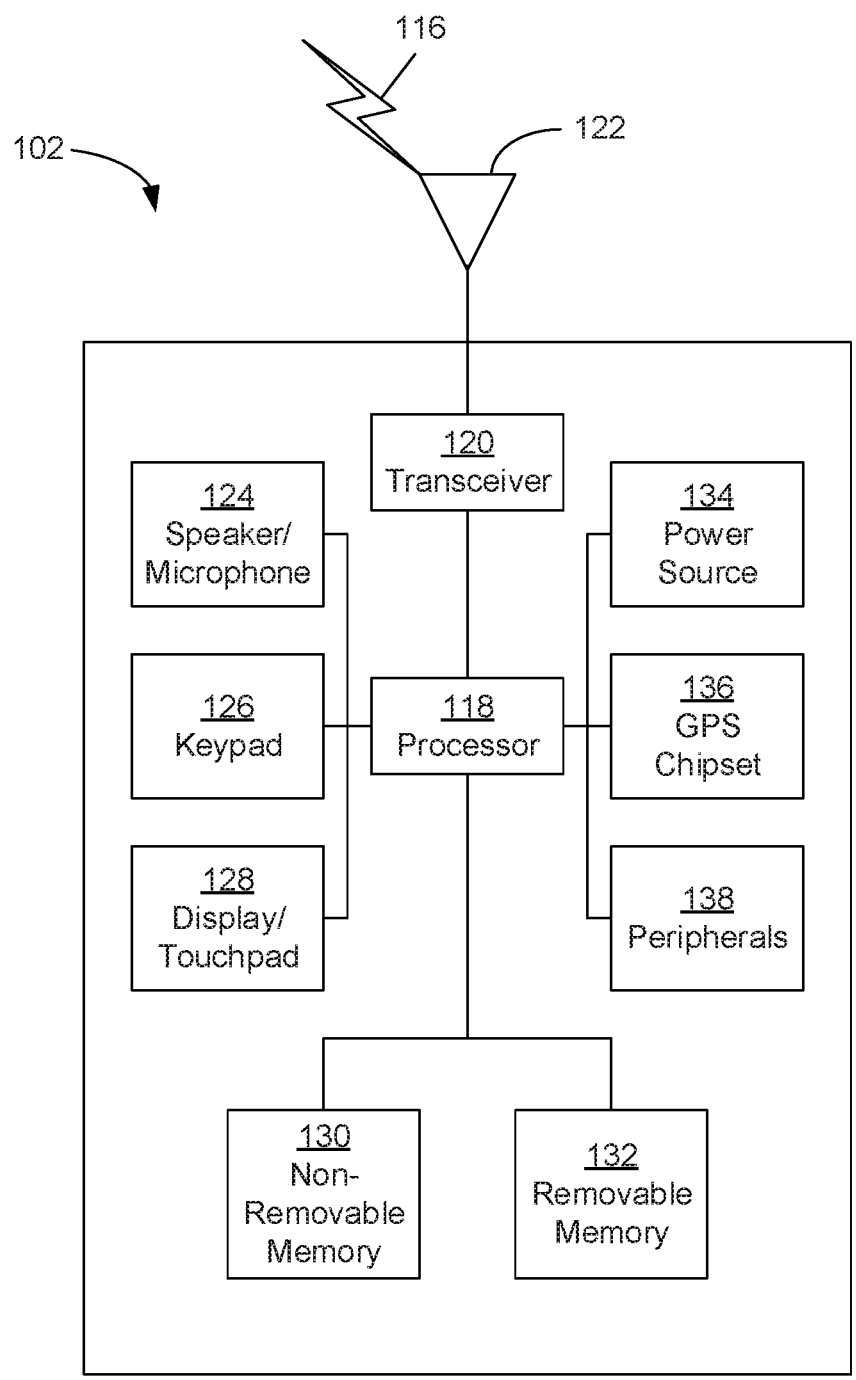
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11 ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
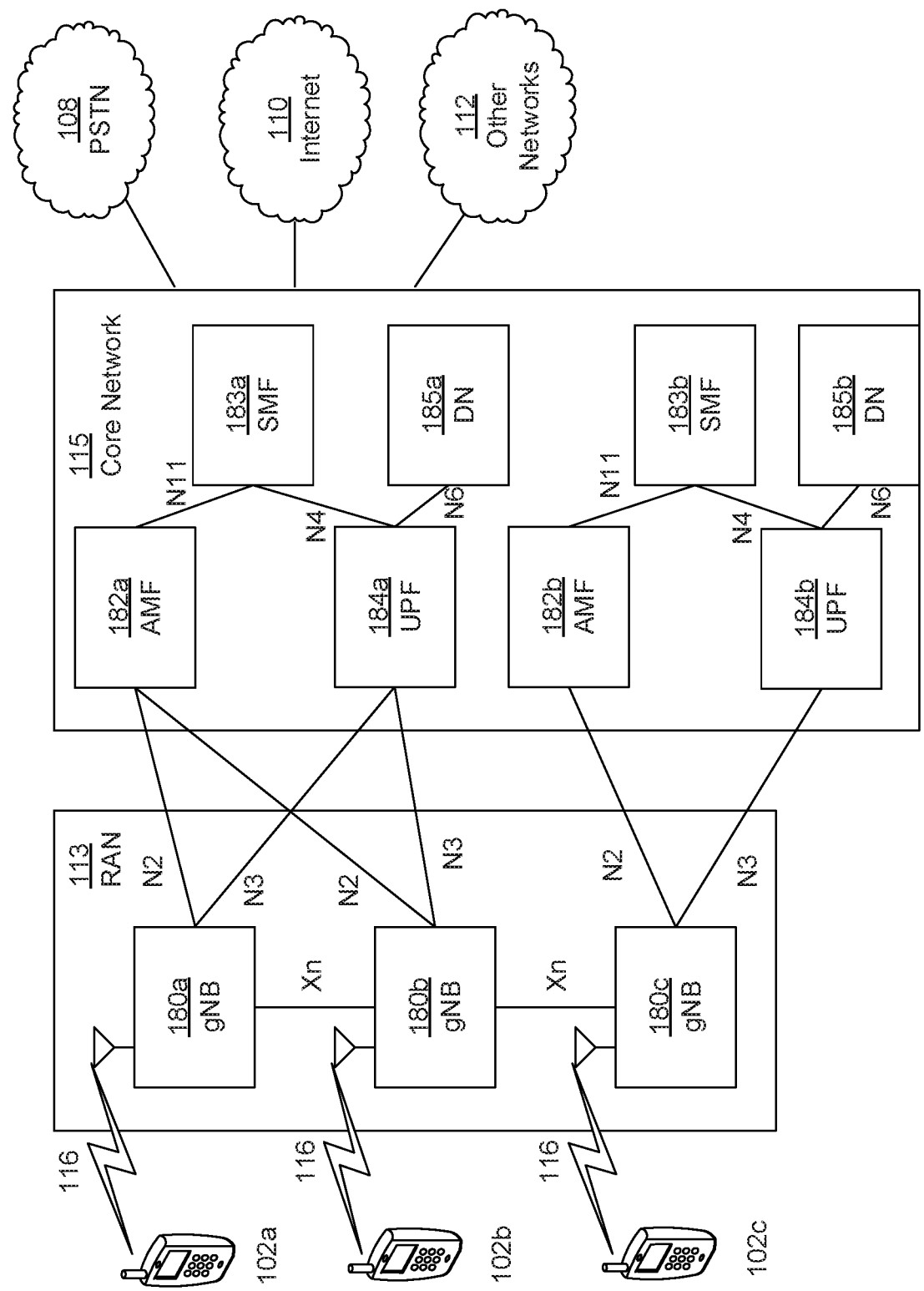
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Table 1 provides a list of acronyms that may be referred to herein.

TABLE 1

| | |
|---|---|
| cNAP | Dent Network Access Point |
| CoAP | Constrained Application Protocol |
| ICN | Information Centric Networking |
| PDU | Packet Data Unit |
| SMF | Session Management Function |
| sNAP | Server Network Access Point |
| sPRID | Structured Proxy Rule Identifier |
| UPF | User Plane Function |
| URI | Uniform Resource Indicator. |

Figure 2:
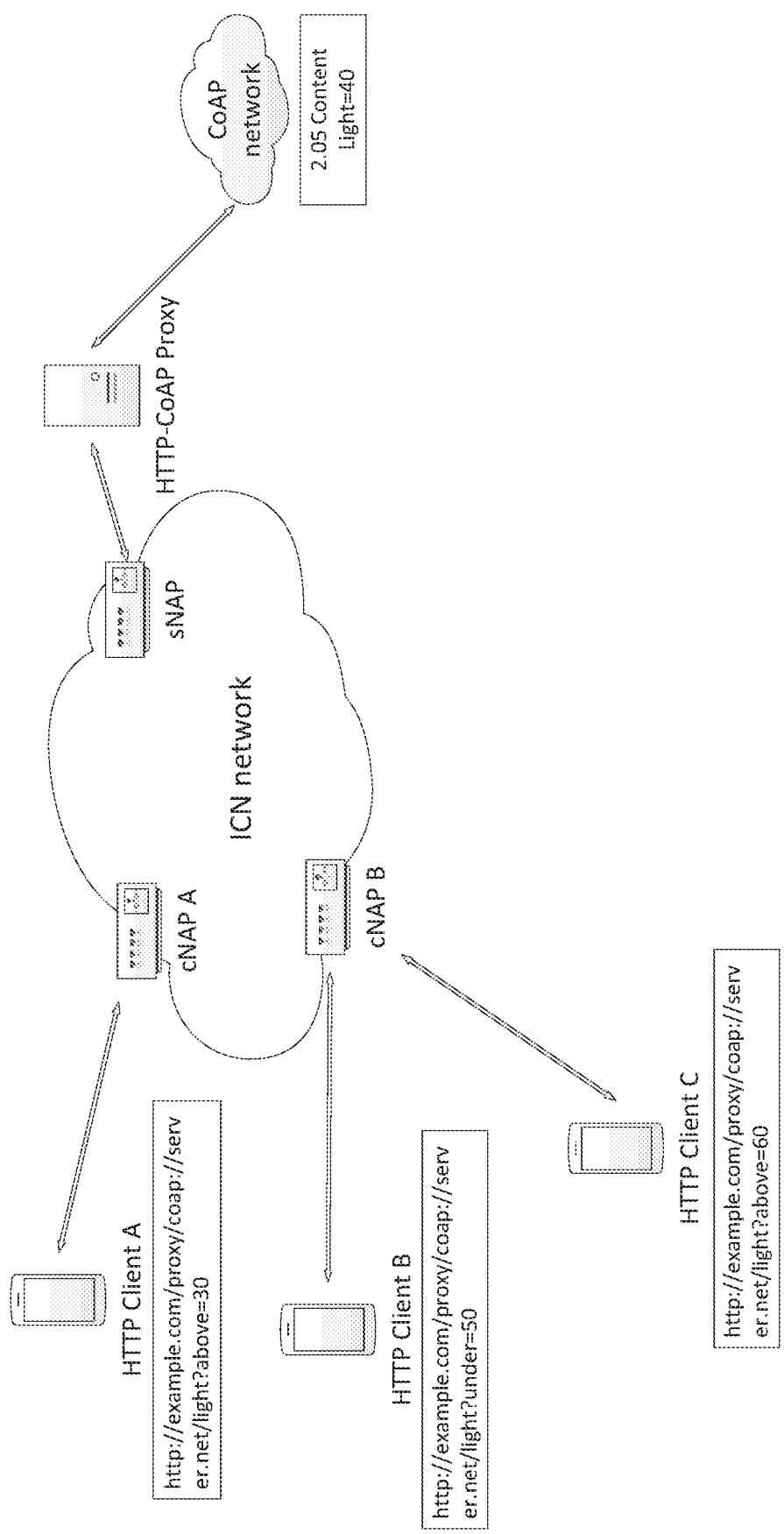
FIG. 2 is a diagram of an example network suitable for identifying requests that may be responded to using multicast responses.

Resource query processing may be provided. Client devices may request to query resources that may be accessible via one or more networks. FIG. 2 shows a diagram of an example network suitable for identifying requests that may be responded to using multicast responses. For example, FIG. 2 may depict an example system adapted for processing and responding to resource queries using multicast responses. In FIG. 2, resources may be made available via a Constrained Application Protocol (CoAP) network. CoAP may be a web transfer protocol used with nodes and networks, such as, for example, constrained nodes and constrained networks. CoAp may be used in an Internet of Things (IoT) environment. Constrained nodes may have limited resources such as, for example, ROM and RAM. As an example, constrained nodes may include sensor devices, which may have limited storage and communication capabilities. Constrained networks may have high packet error rates and low throughput. CoAP may provide a request and response interaction model between application endpoints and employs concepts of the Web such as, for example, use of uniform resource identifiers (URI) and Internet media types. CoAP may also provide the capability to request a CoAP resource with a CoAP query in a query option. The CoAP query may specify an argument with parameterized query options and query values. In FIG. 2, CoAP resources such as, for example, sensor devices, may be available for access and querying via the CoAP network. It will be appreciated that while network resources available via CoAP networks are used for illustration, the potential embodiments extend to network environments providing resources using other than the CoAP protocol.

Referring to FIG. 2, HTTP client devices A, B, and C may be employed to generate and transmit requests to query resources provided by devices accessible on a CoAP network. In an example embodiment, the client devices may employ the hypertext transfer protocol (HTTP) to forward requests. HTTP is a request and response protocol that may operate using a client-server model. For example, a client may submit an HTTP request to a server that provides access to resources such as, for example, HTML files and other content. The HTTP server may communicate a response message to the client. The HTTP response may include completion status information about the request and may also include the requested content in the message body. The HTTP resources may be identified and located on the network using Uniform Resource Locators (URLs), which employ Uniform Resource Identifier (URI) schemes.

Referring to FIG. 2, HTTP client devices A, B, and C may generate and transmit HTTP requests directed towards querying resources that are accessible via the CoAP network. An HTTP-CoAP proxy device may translate HTTP requests received from HTTP client devices A, B, and C and forward the requests to the appropriate CoAP devices via the CoAP network. The HTTP-CoAP proxy device may translate responses from CoAP resource devices within the CoAP network to HTTP response messages suitable for processing at HTTP client devices A, B, and C. The HTTP-CoAP proxy device may allow HTTP client devices to communicate with CoAP resources and vice versa.

As shown in FIG. 2, in an example embodiment, an information-centric networking (ICN) network may communicate messages between HTTP client devices A, B, and C and the CoAP network via the HTTP-CoAP proxy. The ICN may comprise Network Access Points (NAPs), which may provide devices with access to the ICN. As shown in FIG. 2, HTTP client devices A, B, and C may access the ICN via client Network Access Points (cNAPs) A and B. For example, as illustrated in FIG. 2, HTTP client A may access the ICN via cNAP A, and HTTP client B and HTTP client C may access the ICN via cNAP B. The HTTP-CoAP proxy device may access the ICN via a server Network Access Point (sNAP).

In an example embodiment, one or more of the HTTP client devices A, B, and C may request to query a CoAP resource by generating and sending an HTTP request. The HTTP request may include a CoAP request query. A request (e.g. a single request) may be transmitted by one of the HTTP client devices (e.g., HTTP client A, HTTP client B, and/or HTTP client C), and a unicast response (e.g. a single unicast response) may be generated by the sNAP and forwarded to the originating client device. In some scenarios, there may be multiple requests query for the same or similar information. In such an instance, there may be an opportunity to send responses to requests received via multicast, which may reduce network utilization. The responses may be sent at almost the same time. Networking technologies may be used to facilitate the generation and transmission of multicast responses. For example, HTTP messages over an ICN network may be adapted to facilitate sending responses to requests received at a server at almost the same time in a multicast manner. In network environments providing access to CoAP resources, an HTTP-CoAP proxy may be applied to facilitate multicast response delivery in quasi-synchronous access scenarios. Multicast responses may provide the possibility of reducing network utilization.

Identifying requests that may have similar response information may be responded to using a multicast message. For example, identifying requests that are directed to the same or similar response values may be determined based upon similarities in the URIs and/or the header fields of requests. Such processing may not address the details represented in the queries that are associated with requests.

Disclosed herein are processes for identifying requests that may be the same or may be similar and may account for query details that may be specified in the requests. In an example embodiment, one or more (e.g. each) of the HTTP client devices A, B, and C in FIG. 2 may request to access a CoAP resource within the CoAP network by generating and sending an HTTP request that includes a CoAP request. The HTTP request may specify a query for retrieving data from the CoAP resource. A query string or query portion of a request may specify the parameters and the corresponding values that define the query. In the URL, http://example.com/resource?field1=value1&field2=value2, the query portion includes "field1=value1&field2=value2." "Decision criteria for the query may include "field1" and "field 2", and decision values for the query may include "value1" and "value2". The ampersand sign "&" may serve as a separator between the field parameters and values.

In an example embodiment, the query may specify an argument parameterizing the resource and may include a character sequence. An example CoAP request with a query via HTTP request may be formatted as follows: http://HTTP_FQDN/HTTP_URL/coap://CoAP_FQDN/CoAP_URL?QUERY. HTTP_FQDN may indicate a HTTP Fully Qualified Domain name, such as foo.com. HTTP_URL may indicate a HTTP Uniform Resource Locator (URL). CoAP_FQDN may indicate CoAP Fully Qualified Domain Name (FQDN). CoAP_URL may indicate a CoAP URL. CoAP_URI may indicate a CoAP FQDN/CoAP URL. QUERY may indicate a query of the CoAP request.

HTTP client devices A, B, and C may generate a CoAP request including a query for a particular CoAP resource or device. The CoAP requests may be formatted for communication via an HTTP request. As illustrated in FIG. 2, and applying the HTTP formatting structure described herein, the requests generated by HTTP client device A, B, and C may be directed to the same CoAP resource, "coap://server.net" and the same CoAP URL, "light." As illustrated in FIG. 2, up through the CoAP URL, one or more (e.g. each) of the three requests may be the same. However, as illustrated in FIG. 2, the query portions of the requests may be different. For example: in the request generated by HTTP client device A, the query portion specifies "above=30"; in the request generated by HTTP client device B the query portion specifies "under=50"; and in the request generated by HTTP client device C the query portion specifies "above=60." The three HTTP client devices A, B, and C may generate three different CoAP requests that may be directed to the same CoAP resource with different query parameters. The three separate requests could result in three separate unicast responses being generated and returned to the devices, which may increase network utilization.

In some instances, even when the query portion of client device requests are different, the responsive information may be the same. For example, two queries that return the same or similar information may include different content (e.g., different decision criteria and/or different decision values). For example, a first query may specify http://example.com/resource?name=patent, while a second query may specify http://example.com/resource?name=office. The queries may be similar, but may not be the same, and may be satisfied by the same responsive data such as, for example, "Patent Office." Another example URL with query may specify: http://video.foo.com/video000.mp4?user=number. In this example, a video file is requested, but with a specific user (e.g., identified as "number"). Even though video corresponding to a specific user is requested, the same video may apply to several users who may request the resource (e.g., a URL and query specifying, http://video.foo.com/video000.mp4?user=number100).

Identifying requests that have different query portions which may be satisfied by or responded to with the same resource response value, may include parsing query strings at a sNAP or HTTP-CoAP proxy and determining which response values apply to which queries. String parsing may allow for the aggregation of responses prior to the transmission of the responses from the sNAP. Query string parsing may be computationally complex and/or may concentrate the processing load at single logical location in the network.

In an example embodiment of the disclosed systems, structured representations of requests may be generated at distributed locations. The structured information corresponding to a request, including the request's query portion, may be used to evaluate the request's similarity to other requests and/or to determine whether the request may be responded to using a multicast response. Requests to query a resource may be defined by a series of data items, and the data items may serve (e.g., may each serve) a purpose in the definition. For example, a URI-based query may include the following form: {HTTP:COAP}://domain.com/RESOURCE/QUERY_OPERATOR=QUERY_VALUE. In this example format: domain.com may correspond to a fully qualified domain name of the CoAP resource, RESOURCE may correspond to a resource name being requested, QUERY_OPERATOR may correspond to a decision criteria, and QUERY_VALUE may represent a decision value.

In an example embodiment, the QUERY_OPERATOR may have its own query type, which may be referred to as a QUERY_TYPE. The query type may be predetermined.

The query type may be used to identify queries that may be satisfied by the same query response values and, therefore, may result in a multicast response. For instance, queries for "less than" and/or "greater than" have the potential to lead to multicast responses (e.g., as the response values to one or more queries may be the same even if the query operator for the queries are not the same). For example, where a sensor reading is 20, both a query for a sensor reading greater than 10 and a query for a sensor reading greater than 15 may be satisfied by a response (e.g., true). The query type may be used to determine those queries that may be satisfied by the same results and/or which may lead to the formation of multicast groups (e.g., groups of queries where a multicast response will satisfy the queries within the group of queries).

In an example embodiment, query types may be standardized to facilitate determining whether queries may be satisfied by the same result. Table 2 below provides a listing of example pairings between query type and query operators. As shown, in an example embodiment, query types may be associated with query operators. For example, query operators associated with searching for values above or under a designated value may be identified as Type 0. Query operators associated with searching for items to the left or right of a designated object may be identified as Type 1. Similarly query operators associated with searching for values in front of, or behind an object may be identified as Type 2. It may be possible to process queries even where the query types have not been standardized using catalogue-based searches for query operators.

TABLE 2

| QUERY_TYPE | QUERY_OPERATOR |
| --- | --- |
| TYPE0 | above/under |
| TYPE1 | left/right |
| TYPE2 | front/back |

In an example embodiment, requests to query a resource may be processed to generate a structured representation of the resource location and the query specifics. For example, in an example embodiment such as depicted in FIG. 2, cNAPs A and B may generate a structured representation of requests that are received at the respective cNAPs (e.g., request received from HTTP clients A, B, and C, respectively). A structured representation for a request may comprise portions representing the URI of the request, the query type, the query operator, and the query value. The structured representations may be referred to as structured proxy rule identifier (sPRID). When the cNAPs (e.g., cNAP A and cNAP B) forward the requests to query a resource to the sNAP, the structured representations may be forwarded as well.

The sNAP may use the structured information associated with the requests to determine which requests may be satisfied by resource response values that may be the same or may be similar. In an example embodiment, the sNAP 208 may retrieve, from the structured information, the URI and query type for one or more requests (e.g. each) and may compare the URIs and query types to determine the requests that may be satisfied by the same resource response value. The sNAP may forward at least one of the requests, including the requests query, to the appropriate CoAP resource (e.g., via a HTTP CoAP Proxy). Upon receiving the response value to the request, the sNAP may use the query operator and query value of each request along with the response value, to determine whether one or more (e.g. each) requests may be satisfied by the received response value. Those requests that may be determined to be satisfied by the response value may be identified as being the same or similar such that they may be responded to with a multicast response from the sNAP to the cNAPs from which the requests were received.

Figure 3:
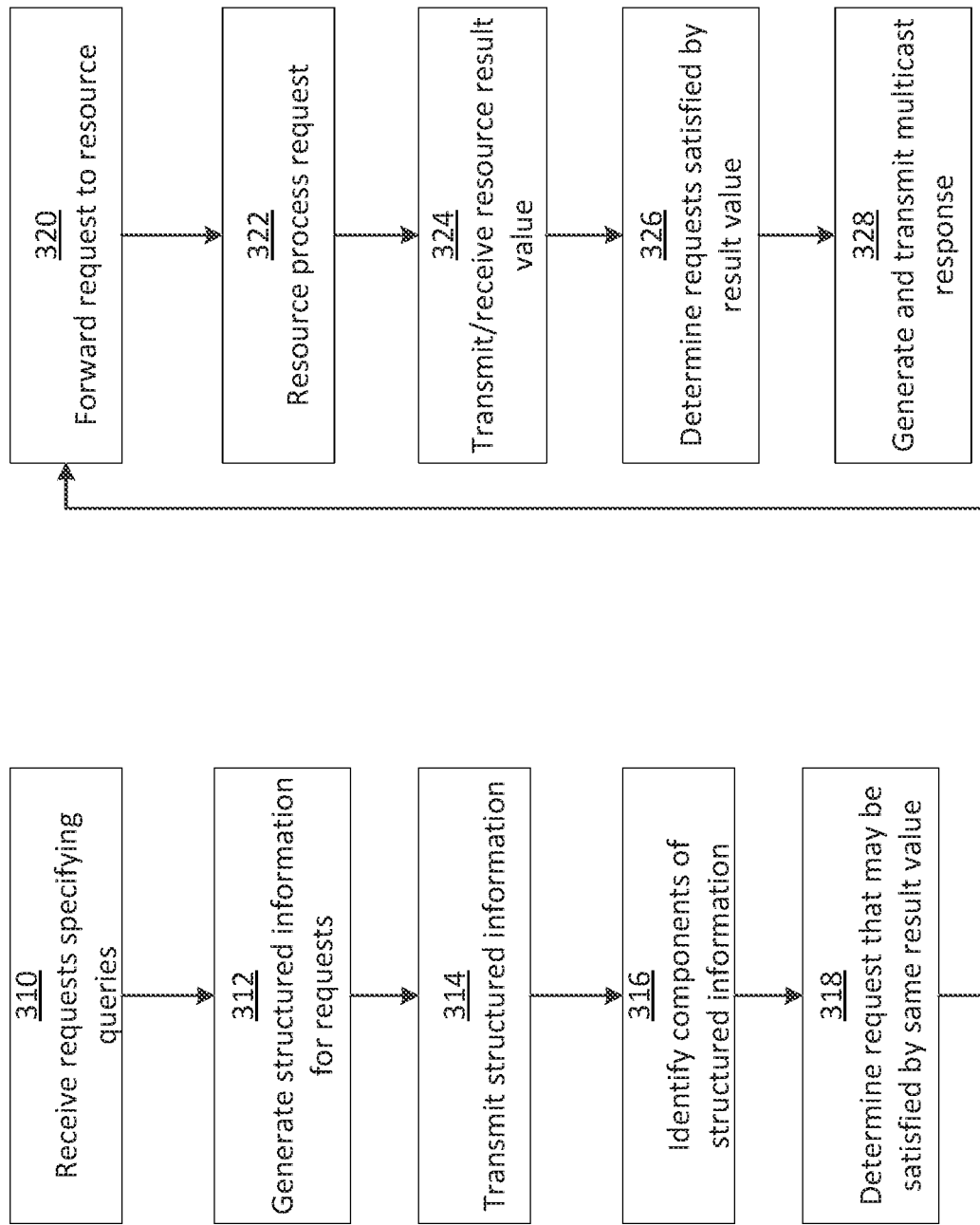
FIG. 3 is a flow diagram of an example process for determining multicast responses.

FIG. 3 depicts a flow diagram of an example process for identifying requests having resource queries that may be satisfied by the same resource response values and, therefore, may be responded to using a multicast response. As shown, at block 310, requests for network resources may be sent by HTTP client devices and received by cNAPs (e.g., sent by HTTP client devices A, B, and C and received at cNAPs A and B from FIG. 2). In an example embodiment, the request may include information specifying the resource that is the intended recipient of the request and data specifying the query intended to be serviced by the request. For example, as shown in FIG. 2, HTTP client A may generate and transmit the following request to cNAP A: http://example.com/proxy/coap://server.net/light?above=30.

Similarly, HTTP clients B and C may respectively generate and transmit the following requests to cNAP B: http://example.com/proxy/coap://server.net/light?under=50 and http://example.com/proxy/coap://server.net/light?above=60. As shown, in an example embodiment, the requests may be formatted as HTTP requests and comprise information defining queries of a CoAP resource. The requests may be formatted and transmitted using any suitable format and/or protocol.

Referring to FIG. 3, at block 312, cNAPs A and B of FIG. 2 may generate (e.g., may generate for each received request) a structured representation of the request. The structured representation of the request may comprise information adapted to serve as the basis for determining the similarity or sameness of the requests to each other. In an example embodiment, cNAPs A and B may generate a structured proxy rule identifier (sPRID) for each request received from HTTP clients A, B, and C, respectively. The sPRID may provide a standard format for representing the details of a request. In an example embodiment, an sPRID may comprise information specifying: the uniform resource identifier (URI) of the CoAP resource; a query type; a query operator; and a query value. The sPRID may be based on, or reflect predetermined query types such as, for example, those noted above in Table 2. The sPRID, by including the URI, query type, query operator, and query value, may allow for determining requests that are directed to the same CoAP resource and/or determining which CoAP resource queries may be satisfied by the same response value.

In an example embodiment, the sPRID may be generated by concatenating bit-wise representations of the CoAP URI, the query type, the query operator, and the query value. For example, an sPRID may be generated using the following function: sPRID=$f_{PRIDGEN}$(hash(URI), QUERY_TYPE, QUERY_OPERATOR, QUERY_VALUE), where $f_{PRIDGEN}$( ) is a concatenation function. The concatenation may comprise a hash of the URI, where the URI may be the partial URI without the query information, e.g., FQDN/RESOURCE. The hash might further include relevant header fields to be considered for the specific CoAP FQDN. Pseudo code for generating an sPRID for each CoAP over HTTP request may include:

```
FOR each outstanding HTTP request
   PRID = f_{PRIDGEN}(hash(CoAP_URI), QUERY_TYPE, QUERY_OPERATOR, QUERY_VALUE)
END
```

As described herein, the $f_{PRIDGEN}()$ function may include a concatenation function.

Figure 4:
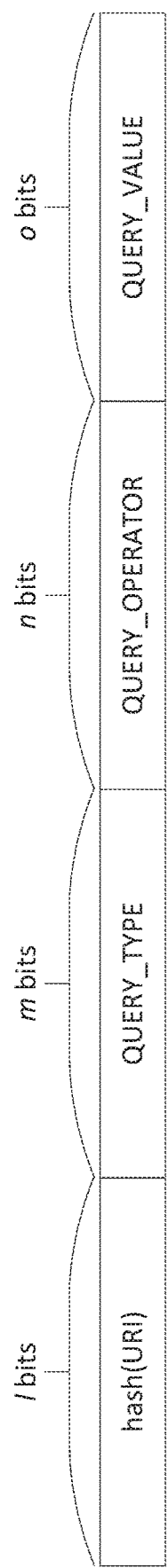
FIG. 4 is a diagram of an example structured format of request information.

FIG. 4 depicts an example format for an sPRID. As described herein and illustrated in FIG. 4, the sPRID may comprise a concatenation of bits representing a hash of the relevant URI, a query type, a query operator, and a query value. In an example embodiment, the URI may be a CoAP URI. The concatenation may communicate relevant information (e.g., may be as long as is necessary to communicate the relevant information). In an example embodiment, the query type, query operator, and query value may map to defined bits. For example, as illustrated in FIG. 4, the hash of the relevant URI may map to l bits, the query type may map to m bits, the query operator may map to n bits, and the query value may be mapped to o bits by means of a discretized value (e.g., real numbers that may be mapped to finite bits). For example, if a query value may be mapped to three bits, the query value may be mapped to eight levels.

Figure 5:
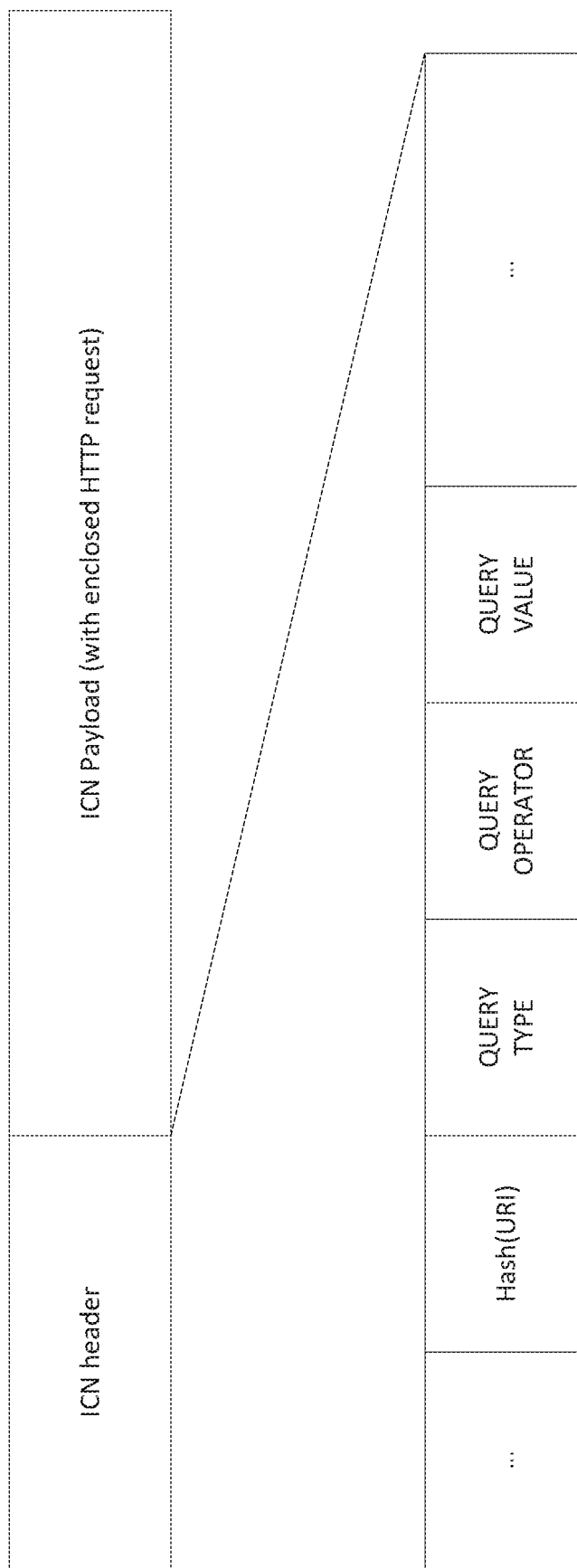
FIG. 5 is a diagram of an example structured format of request information in an ICN header.

The structured information described herein as belonging to the sPRID may be encoded into protocol header. FIG. 5 depicts an example representation of a structured representation of a received request formatted in an ICN header. As shown, the ICN header may comprise information corresponding to the information comprised in the sPRID as discussed above. The header may comprise information corresponding to the URI, query type, query operator, and query value. The structured information in the header may be followed by the encoded HTTP request as a payload. The information in the header may comprise a hash value generated from the URI and bits corresponding to the query type, query operator, and query value. The length of the bits of the protocol header fields may be similar to the number of bits the sPRID discussed herein. The structure and length assignments of the protocol header field may vary depending upon the header format.

Referring again to FIG. 3, at block 314, the requests and resource queries, along with the structured information generated for each of the request, may be transmitted (e.g., communicated or forwarded) to the sNAP (e.g., which may be the sNAP of FIG. 2) corresponding to the network resource to which the requests are to be forwarded. The cNAPs (e.g., cNAPs A and/or cNAP B of FIG. 2) that received the requests and generated the structured information representing those requests, may communicate the structured information to the sNAP corresponding to the resource. When the structured information for the requests is encoded in an ICN protocol header as described herein, such as in connection with FIG. 5, the structured information may be communicated within the protocol packets.

When the structured information for the requests has been formatted as sPRIDs, a sPRID (e.g. each sPRID) may be communicated in a communication protocol header such as, for example, an HTTP header. As described herein, the sPRIDs may be communicated in any suitable portion of the header. For example, when the information is being transmitted in an HTTP header, the information may be encoded in the "If-None-Match" header field of the HTTP protocol.

Figure 6:
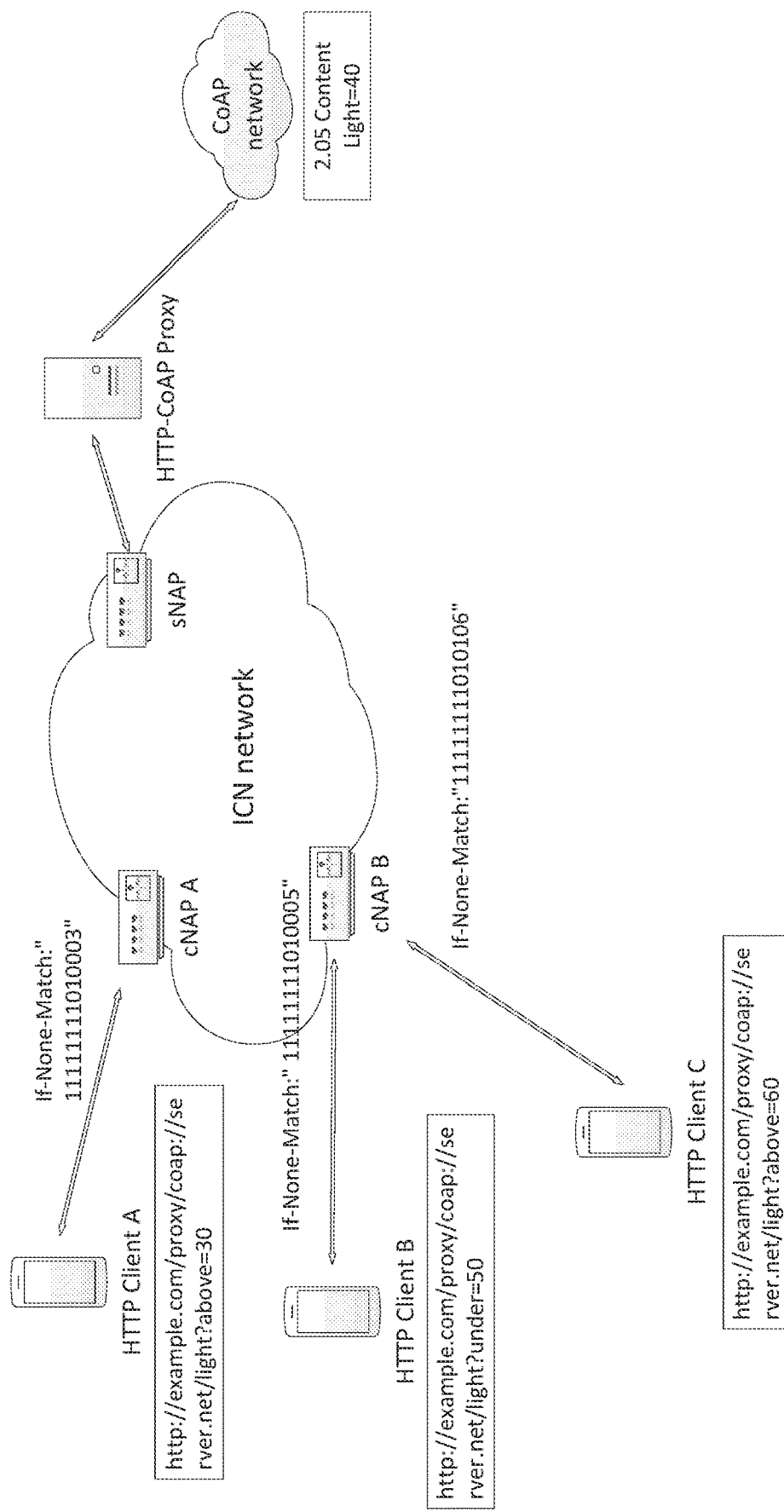
FIG. 6 is a diagram of an example network with an example structured format of request information transmitted in an HTTP header.

FIG. 6 depicts an embodiment wherein the sPRIDs are encoded in HTTP headers. As seen in FIG. 6, HTTP clients may be in communication with a cNAP (e.g., HTTP client A may be in communication with cNAP A, and HTTP clients B and C may be in communication with cNAP B). The cNAPs may be associated with an ICN network. The ICN network may include a sNAP (e.g., may also include a sNAP). The sNAP may be in communication with a CoAP network via an HTTP-CoAP Proxy. The system illustrated in FIG. 6 may provide an HTTP client (e.g., HTTP clients A, B, and C) connected to an ICN network to communicate with CoAP resources within the CoAP network. For example, as shown in FIG. 6, for a request (e.g. each of the requests), an sPRID comprising a series of bits may be generated and stored in the If-None-Match field of the HTTP header by an HTTP client (e.g., HTTP clients A, B, and C). The sPRID may be transmitted via HTTP packets to the appropriate cNAP of the HTTP client. Referring now to block 314 of FIG. 3, the HTTP packets including the headers comprising the sPRIDs may be communicated across the ICN network to a sNAP.

Referring to FIG. 3, at block 316, the components of the structured representation of a request may be identified from the received structured information. Where the structured information is comprised in a sPRID stored in an HTTP header, the sPRID may be extracted from the HTTP header and the relevant components may be extracted from the sPRID. For example, a sNAP may receive the header, extract the sPRID, and/or perform an inverse of the processing used to create the sPRID on the extracted sPRID, Where the sPRID was generated by the $f_{PRIDGEN}$ function described herein, the sNAP may extract the components by performing $f_{PRIDGEN-1}(PRID)^2$. Where $f_{PRIDGEN}$ may be a concatenation, $f_{PRIDGEN-1}$ may include a bitfield split function. The sNAP may process the sPRID and identify the information corresponding to the CoAP URI, the query type, the query operator, and/or the query value.

Referring to FIG. 3, at block 318, a determination of whether the request may be satisfied by the same resource response value may be made for each received request. In an example embodiment, the sNAP that receives the request may identify those requests that are directed to the same CoAP URI and have the same or similar query type. Requests that are directed to the same or similar CoAP URI and that also request the same or similar query type may be satisfied by or responded to by the same response value, and, therefore, may be suitable for a multicast response. The sNAP may generate a multicast group identification (MGID) for one or more request (e.g. each request), where one or more requests that have the same or similar MGID may be identified as potentially being satisfied by the same or similar response value. In an example embodiment, the sNAP may generate a MGID for each request as follows: MGID=$f_{MGIDGEN}$(hash(CoAP_URI), QUERY_TYPE). In an example embodiment and as described herein, $f_{MGIDGEN}$ may include a concatenation function. When the MGID of two requests are equal, the requests may be considered to be part of the same group and potentially may be satisfied by the same resource request response value.

Referring again to FIG. 3, at block 320, one or more of the requests may be forwarded to the appropriate resource for processing. For example, in the scenario wherein the requests are directed to a CoAP resource, one or more of the requests including the corresponding query details may be forwarded to the CoAP network for processing by the appropriate CoAP resource. In an example embodiment, the requests may be communicated via the HTTP-CoAP proxy.

At block 322, the CoAP resources may perform the processing to respond to any requests that are received. For example, and with respect to a request (e.g. each request), where a request is directed to a CoAP sensor device, the sensor device may retrieve the relevant information that is responsive to the query. In an example scenario where the request queries a current light reading of a CoAP light sensor for, the CoAP light sensor may retrieve the current light reading. At block 324, the resource request result value may be transmitted and/or received. For example, the response may be transmitted by the CoAP resource and received by the sNAP via the HTTP-CoAP proxy. The response may be referred to as the response value.

At block 326, the sNAP may determine, based upon the received response value and the query details for one or more of the requests (e.g. each of the requests) that were identified as belonging to a matching group (e.g., requests having the same MGID), which of the identified requests may be resolved or satisfied by the received response value. In an example embodiment where the sNAP has previously generated MGIDs for the requests, the sNAP may evaluate each request associated with the same MGID with the received response value. For example, the sNAP may determine whether requests other than the one for which the response value was received may be satisfied by or resolved using the received response value.

In an example scenario, a response value received in connection with a first request may indicate a value of 40 generated by a CoAP resource. The first request may have queried whether the value is greater than 30. Based upon the received response value of 40, the first request may be responded to. The sNAP may evaluate a second request and its query in view of the response value of 40 associated with the first request. The second request may query whether the value is less than 50. Based upon the received response value to the first request of 40, the second request may also be satisfied and responded to. The second request may be determined to match the first request and the second request may be responded to with the response to the first request via a multicast response message. A third request may query whether the resource value is greater than 60. In this instance, based upon the response value of 40 received in connection with the first request, the third request may not be satisfied. In such an instance, the first and second requests may be responded to using the same received result value, while the third request may not. For example, the sNAP may respond with false.

A pseudo-code representation of the processing to determine whether requests are satisfied by a received response value and therefore may be included in a multicast group for delivery may include:

```
IF (f_MATCH(PRID, QUERY_OPERATOR, QUERY_VALUE, RESPONSE_VALUE)==TRUE)
    Add HTTP request to the multicast group of MGID for this response
ELSE
    Unicast delivery of this HTTP request
END
f_MATCH(PPID, QUERY_OPERATOR, QUERY_VALUE, RESPONSE_VALUE) {
    IF (PRID matched) {
        IF (compare QUERY_VALUE and RESPONSE_VALUE by QUEPY_OPERATOR ==
        TRUE) {
            RETURN TRUE;
        ELSE
            RETURN FALSE;
        END
    }
}
END
```

Applying the $f_{MATCH}$ function to the requests noted in FIG. 2, may result in the following: HTTP Client A's request, $f_{MATCH}$(PRID, ABOVE, 30, 40)=TRUE; HTTP Client B's request, $f_{MATCH}$(PRID, UNDER, 50, 40)=TRUE; HTTP Client C's request, $f_{MATCH}$(PRID, ABOVE, 60, 40)=FALSE. Where the matching function $f_{MATCH}$ returns "TRUE," the request may be satisfied by the received response value and the response may be multicast. Where the matching function $f_{MATCH}$ returns "FALSE" and the sNAP may accurately respond to a request (e.g., HTTP Client Cs request), the sNAP may unicast the response.

Referring to FIG. 3, at block 328, a sNAP may generate and transmit a multicast response directed to those requests that were identified as being satisfied by the same resource response value (e.g., where $f_{MATCH}$ returns "TRUE"). The multicast response may be subsequently received at cNAPs from which the corresponding requests were received. The cNAPs, in turn, may generate and transmit a response to the HTTP client devices from which the requests were received. For example, referring to FIG. 2, where the requests from HTTP client devices A and B are determined to match by virtue of being satisfied by the same response value, a multicast response may be communicated by the sNAP to cNAPs A and B, which may return responses to HTTP client devices A and B.

In an example embodiment, when a new request arrives after a MGID has been generated and/or the evaluation of existing requests relative to that MGID is ongoing, the newly arrived request may be processed and considered along with the existing requests. Request that are received after an MGID has been generated and existing requests are being evaluated, might alternatively be processed and considered separately. In an example embodiment, the MGID may be deleted after a response is sent back to the cNAPs.

Identifying requests that are satisfied by the same response values may be facilitated by latencies introduced in the delivery of the resource response value from the CoAP resource over the HTTP/CoAP proxy to the sNAP. For instance, the CoAP resource might not respond immediately to the proxy (e.g., for power efficiency reasons). For example, the reply may be transmitted after a power cycle is completed, which may last a few seconds. During the time it takes to complete a power cycle, the sNAP may receive additional requests that may correspond to the multicast group. The additional request may be added to the multicast group and a received response may be processed using one or more of the techniques described herein.

In an example embodiment, the requests received from the client devices may specify a "CoAP OBSERVE" operation whereby the sNAP and HTTP/CoAP Proxy may send updates using the multicast responses upon receiving new response values from the CoAP resource. Where an updated response value is received from a CoAP resource at the sNAP/HTTP-CoAP proxy, the sNAP may use a previously identified group to evaluate whether the updated response value applies and/or may generate a multicast response to forward such information. In such an embodiment, CoAP response values may be considered to be valid for a period of time and, during that period of time, may be used to respond to additional requests to the same CoAP resource.

In an example embodiment wherein requests may be received at a sNAP and considered with other previously received requests, the sNAP may intentionally delay generating an MGID and processing requests relative to the MGID. The sNAP may wait for other HTTP requests directed to the same URI and formulate a larger multicast group (e.g., having a higher probability of multicasting responses). Such an intentional delay may be based on the sNAP inspecting the original incoming request in order to determine the usefulness and length of such delay based on the specific information being requested. For example, the sNAP may inspect an incoming request for a video chunk based on the originally requested manifest file. Through inspecting the returned manifest file, a maximum chunk length may be determined such that requests to chunks defined in the manifest file may be delayed depending on said chunk length. For example, a sNAP may determine a delay based on a chunk length and/or an observed network latency plus a heuristic (e.g., an implementation-dependent parameter). The sNAP may maintain an internal list of request URIs for which it has determined such an intentional delay based on the inspection of related metadata. If an incoming request matches any of the URIs in said table, the sNAP may perform the intentional delay, while maintaining an extensible list of clients as described herein. Through such an intentional delay, the probability of receiving additional requests and therefore including them into the multicast group (e.g., identified through the transient MGID for the original request) may increase, which may increase the potential for the multicast gain.

Figure 7:
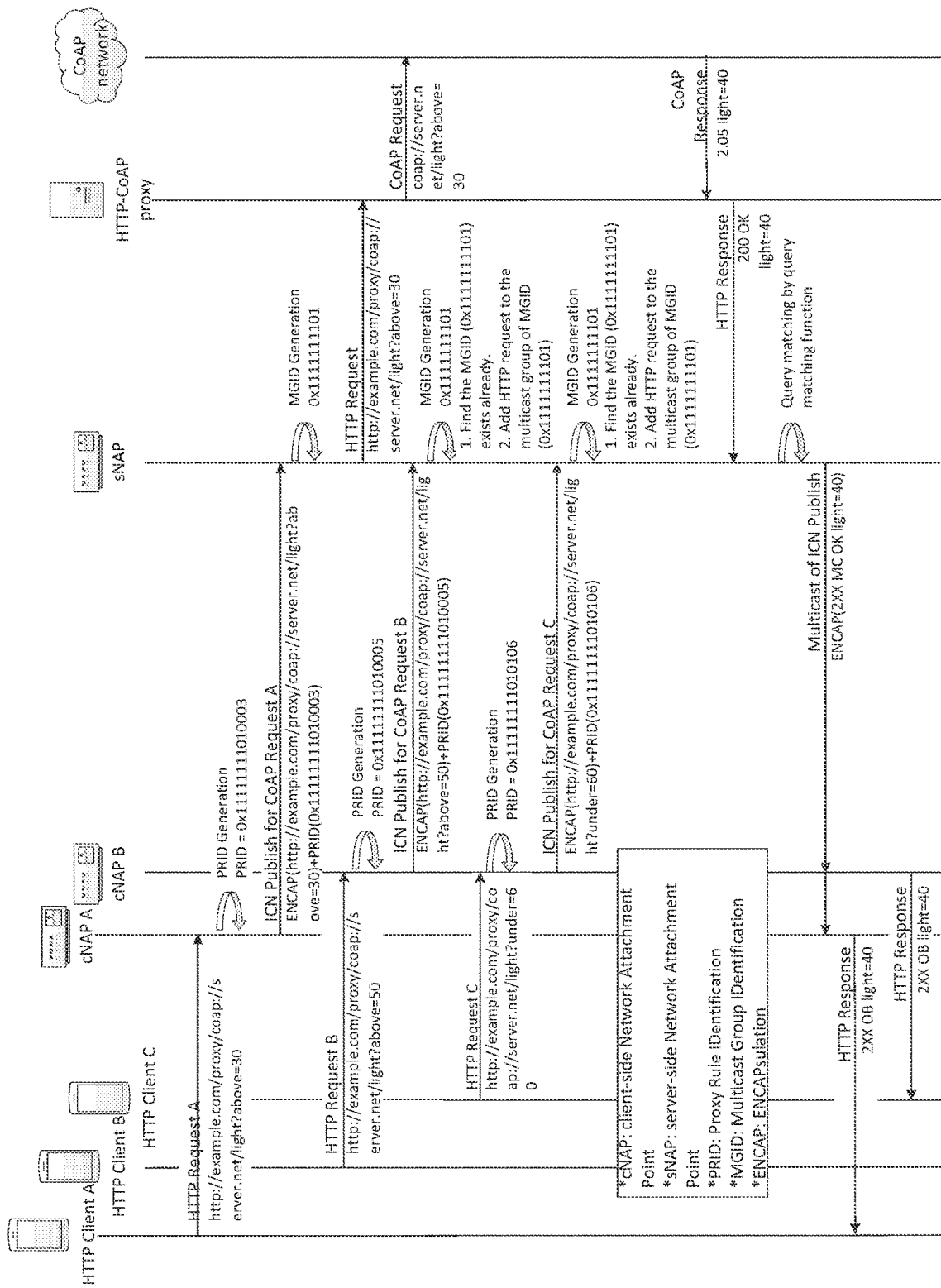
FIG. 7 is an example message sequence chart for example processing for identifying resource queries satisfied by the same resource result value.

FIG. 7 depicts a message sequence chart for an example processing of requests to query network resources. As shown in FIG. 7, in an example scenario, each of HTTP clients A, B, and C may generate a request comprising a query of a CoAP resource. HTTP Request A, generated by HTTP client A, may specify as follows: http://example.com/proxy/coap://server.net/light?above=30. HTTP Request A may be directed to CoAP resource "server.net" and may query whether a light value is above 30. HTTP Request A may be transmitted to cNAP A. HTTP Request B, which may be generated by HTTP client B, may specify as follows: http://example.com/proxy/coap://server.net/light?above=50. HTTP Request B may be directed to the same CoAP resource, "server.net," and may query whether the light value is above 50. HTTP Request C, which may be generated by HTTP client C, may specify as follows: http://example.com/proxy/coap://server.net/light?under=60. HTTP Request C may be directed to the same CoAP resource as HTTP Requests A and B, "server.net," and may query whether the light value is under 60. As illustrated in FIG. 7, HTTP Requests B and C may be forwarded to cNAP B.

One or more of the requests (e.g. each of the requests) may be processed by the corresponding cNAP to generate a structured representation of the request. For example, HTTP Request A may be processed by cNAP A, and HTTP Requests B and C may be process by cNAP B. Referring to HTTP Request A, the hash value of the CoAP URI (coap://server.net/light) may include 0x11111111 and the query type of the query operators (e.g., above or under) may include 0x01. The query operators for 'above' and 'under' may be represented by 0x00 and 0x01, respectively. The query value may be mapped to a value representing a multiple of ten that is represented by the value. For example, a query value of 30 may be mapped to 3 and the QUERY_VALUE portion of the sPRID may be represented using 1 byte. The structured representation (referred to in FIG. 7 as PRID) associated with HTTP Request A (http://example.com/proxy/coap://server.net/light?above=30) may include 0x111111111010003. Similarly, the structured representations of HTTP requests B and C may include 0x111111111010005 and 0x111111111010106, respectively.

cNAPs A and B may communicate the structured representations to a sNAP. For example: cNAP A may communicate the structured representation of HTTP request A to the sNAP, and cNAP B may communicate the structured representation of HTTP requests B and C to the sNAP. In the scenario depicted in FIG. 7, the structured request representations may be communicated by encoding the structured representations in ICN protocol headers. cNAP A may publish or forward HTTP request A with the structured representation of the request to sNAP. Similarly, cNAP B may publish or forward HTTP requests B and C and the structured representations of those requests to the sNAP.

The sNAP may extract the structured representation of HTTP request A from the message received from cNAP A and generates a multicast group identification (MGID) for HTTP Request A. The sNAP may generate the MGID consistent with the discussions herein in connection with block 318 of FIG. 3. In the embodiment illustrated in FIG. 7, the sNAP may determine that the MGID for HTTP request A is 0x111111101. The sNAP may forward the CoAP resource query request corresponding to HTTP request A to the CoAP network via the HTTP-CoAP proxy.

With respect to HTTP request B, the sNAP may extract the structured information received from cNAP B and generate an MGID based upon the extracted information consistent with the discussion herein in connection with block 318 of FIG. 3. In the embodiment depicted in FIG. 7, the MGID for request B is 0x1111111101. The sNAP may determine that the same MGID already exists (e.g., from HTTP request A) and may add HTTP request B to the multicast group of the calculated MGID.

With respect to HTTP request C, the sNAP may extract the structured information received from cNAP C and generate an MGID based upon the extracted information consistent with the discussion herein in connection with block 318 of FIG. 3. In the depicted scenario, the MGID for request C is 0x1111111101. The sNAP may determine that the same MGID already exists (e.g., from HTTP requests A and B) and may add HTTP request C to the multicast group of the calculated MGID.

As shown in FIG. 7, the CoAP network may return a response value to the CoAP resource query of HTTP request A. The sNAP may receive the response value via the HTTP-CoAP proxy. In the example embodiment depicted in FIG. 7, the response to HTTP Request A may indicate a value of 40.

The sNAP may use the returned response value to evaluate each of the requests that have been identified as belonging to the same multicast group as HTTP request A (e.g., request having the same MGID as HTTP Request A). For example, the sNAP may evaluate the response value for each of the requests associated with the same MGID as HTTP request A (e.g., HTTP request B and C). The sNAP may use the returned value of 40 to evaluate each of the HTTP requests A, B, and C that have been associated with the multicast group (e.g., MGID 0x1111111101). The sNAP may perform processing consistent with processing described herein in connection with block 326 of FIG. 3. In the embodiment of FIG. 7, the sNAP may determine that for HTTP request A, which queried whether the value is above 30, a response value of 40 may satisfy the request (e.g., a response to HTTP Request A may include "TRUE"). Where the response value is 40, HTTP request A may be determined to be part of a multicast group. The sNAP may determine that, for HTTP Request B, which queried whether the value is above 50, the response value of 40 may not satisfy request B (e.g., a response to HTTP Request B may include "FALSE"). Where the response value is 40, HTTP request B may not be determined to be part of a multicast group. The sNAP may determine that, for HTTP request C, which queried whether the value is under 60, the response value of 40 may satisfy the request (e.g., a response to HTTP Request C may include "TRUE"). Where the response value is 40, request C may be determined to be part of the multicast group.

For those requests that are determined to be part of the multicast group, a single multicast message may be transmitted. In the scenario where HTTP request A and C are determined to be satisfied by the same resource value and part of the same multicast group, a single multicast message may be sent from the sNAP to cNAPs A and B providing the response for HTTP requests A and C. cNAPs A and B may generate and communicate messages with the response value to HTTP clients A and C, respectively. With respect to request B a response may or may not be sent. For example, in response to request B, a unicast response may be sent from the sNAP to cNAP B, which may provide the response to HTTP request B. cNAP B may generate and communicate messages with the response value to HTTP client B. As another example, an sNAP may not wait until a query value may be satisfied may send a FALSE value to a cNAP when the $f_{MATCH}$ may return false.

The processing described herein may be performed by any suitable devices and/or a combination of devices. For example, while the sNAP of FIG. 2 may be employed to perform various portions of the processing described herein, the same or similar processing may be performed entirely or partially by the HTTP/CoAP proxy (e.g., for an embodiment wherein the structured information is communicated in an HTTP header). In such an embodiment, the multicast group formation function may not result in a multicast delivery for a single response. The multicast group formation function may result in the sending of individual unicast responses for found requests (e.g. all found requests). In an example scenario where multicast group formation functions may not be supported, an HTTP/CoAP proxy may perform query string parsing on one or more requests (e.g., if the HTTP/CoAP proxy support queries, which many do not), which may increase computational complexity. The HTTP/CoAP proxy may reject the request (e.g., if it does not support queries at all). Such an embodiment may rely upon message delivery over a standard IP network or an ICN network.

Figure 8:
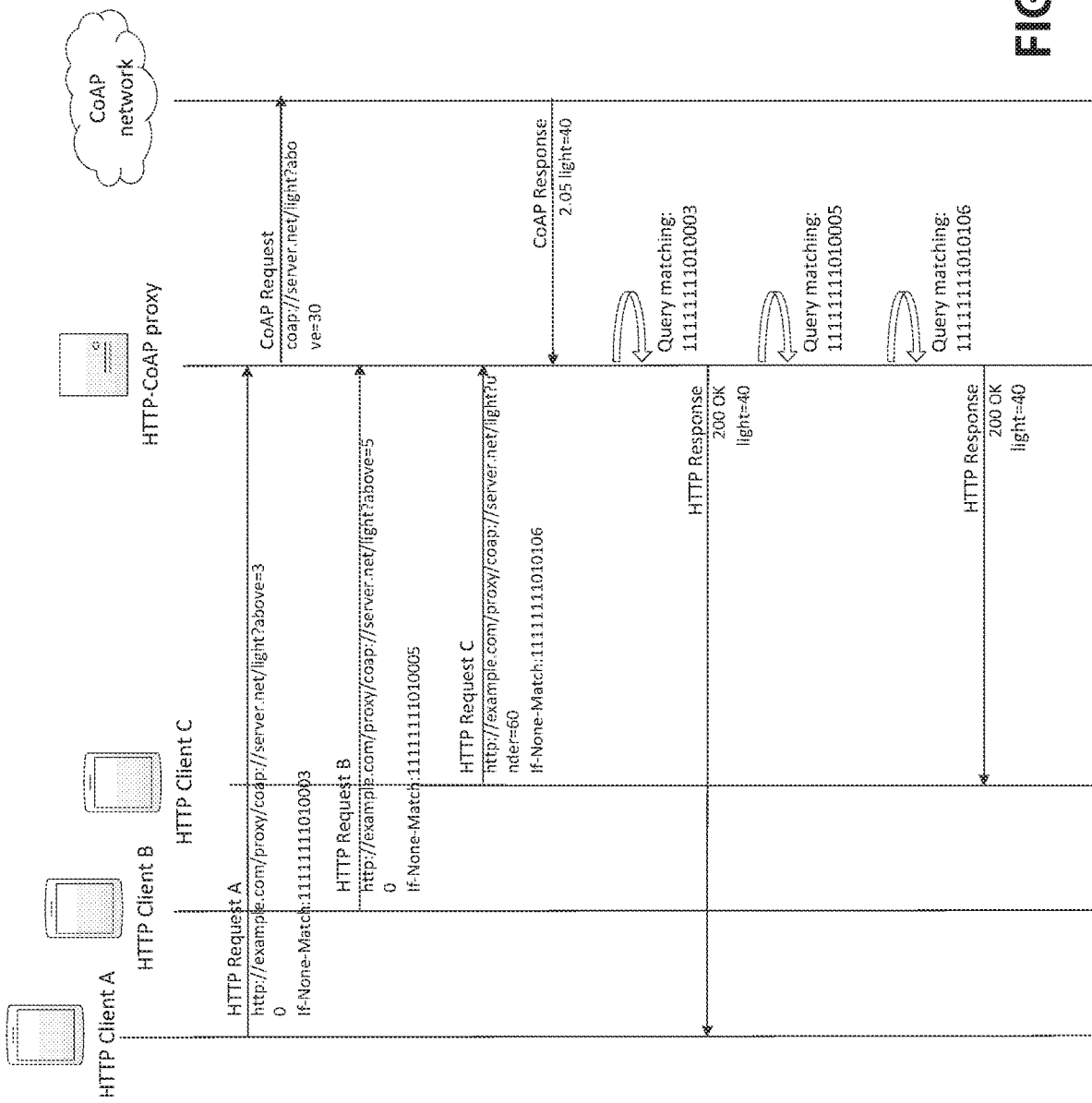
FIG. 8 is an example message sequence chart for example processing for identifying resource queries satisfied by the same resource result value.

FIG. 8 depicts a message sequence chart of example processing for providing message responses where the structured information is communicated in HTTP protocol headers. As described herein and shown in FIG. 8, HTTP clients A, B, and C may generate a request comprising a query of a CoAP resource. The content of the request (e.g. each of the requests) may be the same as those discussed herein in connection with FIG. 7. HTTP Request A, generated by HTTP client A, may specify as follows: http://example.com/proxy/coap:///server.net/light?above=30. HTTP Request A may be directed to CoAP resource "server.net" and may query whether a light value is above 30. HTTP Request B, which may be generated by HTTP client B, may specify as follows: http://example.com/proxy/coap:///server.net/light?above=50. HTTP Request B may be directed to the same CoAP resource, "server.net," and may query whether the light value is above 50. HTTP Request C, which may be generated by HTTP client C, may specify as follows: http://example.com/proxy/coap:///server.net/light?under=60.

HTTP Request C may be directed to the same CoAP resource as HTTP Requests A and B, "server.net," and may query whether the light value is under 60. In the example scenario of FIG. 8, however, the structured information may be encoded in an HTTP header (e.g., as opposed to the ICN protocol header of FIG. 7). In the example scenario depicted in FIG. 8, the structured information representative of each of the requests may be encoded in the "If-None-Match" field of the HTTP protocol header.

As illustrated in FIG. 8, HTTP clients A, B, and C may communicate their respective requests to an HTTP-CoAP proxy. The HTTP-CoAP proxy may process the request using techniques similar to the techniques used by the sNAP as described herein in connection with FIG. 7. For example, the HTTP-CoAP proxy may extract the structured representation of HTTP request A from the message received from HTTP client A and generate a multicast group identification (MGID). The HTTP-CoAP proxy may generate the MGID consistent with the discussions herein in connection with block 318 of FIG. 3. In the embodiment illustrated in FIG. 8, the HTTP-CoAP proxy may determines the MGID for request A is 0x1111111101. The HTTP-CoAP proxy may forward the CoAP resource query request corresponding to request A to the CoAP network.

With respect to HTTP Request B, the HTTP-CoAP proxy may extract the structured information received from HTTP client B and generate an MGID based upon the extracted information consistent with the discussion above in connection with block 318 of FIG. 3. In the embodiment depicted in FIG. 8, the MGID for request B is 0x1111111101. The HTTP-CoAP proxy may determine that the same MGID already exists (e.g., for HTTP Request A) and may add HTTP Request B to the multicast group of the calculated MGID.

With respect to HTTP Request C, the HTTP-CoAP proxy may extract the structured information received from HTTP client C and generate an MGID based upon the extracted information consistent with the discussions herein in connection with block 318 of FIG. 3. In the depicted scenario, the MGID for HTTP Request C is 0x1111111101. The HTTP-CoAP proxy may determine that the same MGID already exists (e.g., for HTTP requests A and B) and add HTTP request C to the multicast group of the calculated MGID.

As shown in FIG. 8, the CoAP network returns a response value to the CoAP resource query of request A to the HTTP-CoAP proxy. In the example embodiment depicted in FIG. 8, the response to HTTP Request A may indicate a value of 40.

The HTTP-CoAP proxy may use the returned response value to evaluate each of the requests that have been identified as belonging to the same multicast group as HTTP request A (e.g., request having the same MGID as HTTP Request A). For example, the HTTP-CoAP proxy may evaluate the response value for each of the requests associated with the same MGID as HTTP request A. The HTTP-CoAP proxy may use the returned value of 40 to evaluate HTTP Requests A, B, and C that have been associated with the multicast group. The HTTP-CoAP proxy may perform processing consistent with that described herein in connection with block 326 of FIG. 3. In the embodiment of FIG. 8, the HTTP-CoAP may determine for HTTP request A, which queried whether the value was above 30, that the response value of 40 satisfies the request. Where the response value is 40, HTTP request A is determined to be part of a multicast group. The HTTP-CoAP proxy may determine that for HTTP request B, which queried whether the value is above 50, that the response value of 40 does not satisfy request B (e.g., the $f_{MATCH}$ function returns "FALSE"). Where the response value is 40, request B is determined not to be part of the group. The HTTP-CoAP proxy determines for request C, which queried whether the value is under 60, that the response value is 40 does satisfy the request (e.g., the $f_{MATCH}$ function returns "TRUE"). Where the response value is 40, HTTP request C is determined to be part of the group.

For those requests that are determined to be part of the group, the HTTP-CoAP proxy may generate responses to each of the clients that have been identified as part of the group. In the scenario where HTTP Requests A and C are determined to be satisfied by the same resource value and part of the same group, the HTTP-CoAP proxy may send an HTTP response message to HTTP clients A and C. In the embodiment depicted in FIG. 8, a single multicast message may not be used to communicate the response to the identified client requests. Nevertheless, the processing identifying groups of requests that are satisfied by the same response value may simplify processing between the HTTP-CoAP proxy and CoAP network.

Disclosed herein are systems and methods for identifying requests to query network resources that may be satisfied by the same resource response values, and which, therefore, may be responded to using a multicast response. In an example embodiment, each of a plurality of requests to query a network resource are processed to generate structured information corresponding to the URI of the network resource and details of the requested query. Each request, along with the corresponding structured information may be communicated to a network access point (NAP) adapted to provide access to the requested resource. The NAP may determine, using a portion of the structured information, those requests that may possibly be grouped together as being satisfied by the same resource response value. At least one of the requests may be forwarded to the appropriate network resource (e.g., CoAP network resource) for processing. Upon receipt of a resource response value from the network resource, the NAP may use the response value to evaluate each of the requests that were identified as potentially being grouped together as being satisfied by the same response value. In an example embodiment, for each request that was identified as possibly being grouped together, the NAP uses information regarding the query associated with the request to determine whether the query is satisfied by the received resource response value. If so, the request may be identified as belonging to the group. For those requests determined to be associated with the group, a multicast response message may be generated and transmitted.

It will be appreciated that while illustrative embodiments have been disclosed, the scope of potential embodiments is not limited to those explicitly set out. For example, while the system has been described with reference to an ICN network, CoAP protocol, and HTTP protocol, the envisioned embodiments extend beyond implementations using a particular network layer technology. Likewise, the potential implementations extend to all types of service layer architectures, systems, and embodiments. While the illustrative embodiments refer to particular protocols, the processing may be performed by other suitable protocols A device may be configured to receive, process, forward, and/or respond to one or more resource requests. The device may determine whether multiple queries are satisfied by a multicast response. For example, the device may receive a first query and a second query directed to a resource. The first query and the second query may each comprise a structure proxy rule identifier (sPRID). For example, the first query may be a first resource query and may comprise a first sPRID and the second query may be a second resource query and may comprise a second sPRID. The device may determine a similarity between the first query and the second query. For example, the similarity determination may be based on the sPRID of the first query and the sPRID of the second query. The device may determine whether a response that satisfies the first query also satisfies the second query. The response to the second query may be based on the response to the first query, information included in the sPRID of the first query, and/or information included within the second query. If the response to the first query satisfies both the first query and the second query, the device may multicast the response to the first query.

The device may be configured to generate a multicast group identifier (MGID), which may be used to determine the similarity between queries. For example, a MGID may be generated based on a uniform resource identifier (URI) and a query type for a query. The URI and the query type may be extracted from the sPRID of the query. The MGIDs of one or more queries may be compared to determine the similarity between the queries. If, for example, the MGID of the queries are the same, the queries may be determined to be similar. If, however, the MGID of the queries are not the same, the queries may be determined not to be similar.

The device may determine whether to include a query having the same MGID in a multicast group associated with the MGID or a unicast group associated with the MGID. A multicast response may be transmitted to the queries in the multicast group associated with the MGID. The determination of whether to include a query in the multicast group or the unicast group may be based on information extracted from the sPRID of the query and/or a response to the query. For example, the information extracted from the sPRID of the query may include a uniform resource identifier (URI) that the query is directed to and/or a query type associated with the query.

A device may generate an sPRID for a query and may be attached to the query. The sPRID may include a concatenation of information associated with the query. For example, the sPRID may include a concatenation of: a hash of the URI where the query is directed to, a query type, a query operation, a query value, and the like. The query may be updated to include the sPRID. For example, the sPRID may be encoded in a protocol header associated with the query.

For example, an ICN header and/or an HTTP If-None-Match header may be encoded in a protocol header.

A method and/or a device for processing requests may be provided. The device may comprise a memory and a processor. The processor may be configured to perform a number of actions. A first resource query directed to a resource may be received. The first resource query may comprise a first structured proxy rule identifier (sPRID). A second resource query directed to the resource may be received. The second resource query may comprise a second sPRID. A similarity between the first resource query and the second resource query may be determined. A response to the first query that may satisfy the second resource query may be determined. A response to the first resource query may be multicast. A response to the first resource query may be received. A multicast group identifier (MGID) for the first resource query may be generated based on a URI for the first resource query and a query type for the first resource query. The URI may be extracted from the first sPRID. A query type for the first resource query may be extracted from the sPRID. A MGID for the second resource query may be generated based on a URI for the second resource query and a query type of the second resource query.

A method and/or device for processing requests may be provided. The device may comprise a memory and a processor. The processor may be configured to perform a number of actions. A resource query directed to a resource may be received. The resource query may comprise one or more of a URI, a query type, a query operation, a query value, and the like. A sPRID associated with the resource query may be generated. The resource query may be updated to comprise the sPRID associated with the resource query.

It is understood that the entities performing the processes described herein may be logical entities that may be implemented in the form of software (e.g., computer-executable instructions) stored in a memory of, and executing on a processor of, a mobile device, network node or computer system. That is, the method(s) may be implemented in the form of software (e.g., computer-executable instructions) stored in a memory of a mobile device and/or network node, such as the node or computer system, which computer executable instructions, when executed by a processor of the node, perform the processes discussed. It is also understood that any transmitting and receiving processes illustrated in FIGs may be performed by communication circuitry of the node under control of the processor of the node and the computer-executable instructions (e.g., software) that it executes.

The various techniques described herein may be implemented in connection with hardware or software or, where appropriate, with a combination of both. Thus, the methods and apparatus of the subject matter described herein, or certain aspects or portions thereof, may take the form of program code (e.g., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together may include code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A device for processing a query for a resource, the device comprising:
   a memory; and
   a processor, configured to:
   receive a first resource query directed to the resource, wherein the first resource query comprises a first structured proxy rule identifier (sPRID);
   receive a second resource query directed to the resource, wherein the second resource query comprises a second sPRID;

determine a similarity between the first resource query and the second resource query using a portion of the first sPRID and a portion of the second sPRID;

determine that a response to the first resource query satisfies the second resource query using the similarity between the first resource query and the second resource query; and multicast the response to the first resource query.

2. The device of claim 1, wherein the processor is further configured to receive the response to the first resource query.

3. The device of claim 1, wherein the processor is further configured to generate a multicast group identifier (MGID) for the first resource query based on a uniform resource identifier (URI) for the first resource query and a query type of the first resource query.

4. The device of claim 3, wherein the processor is further configured to extract, from the first sPRID, the URI for the first resource query and the query type of the first resource query.

5. The device of claim 3, wherein the processor is further configured to generate a MGID for the second resource query based on a URI for the second resource query and a query type of the second resource query.

6. The device of claim 5, wherein the processor is further configured to extract, from the second sPRID, the URI for the second resource query and the query type of the second resource query.

7. The device of claim 5, wherein the processor is further configured to determine the similarity between the first resource query and the second resource query using the portion of the first sPRID and the portion of the second sPRID by determining that the MGID for the first resource query and the MGID for the second resource query are the same.

8. The device of claim 3, wherein the processor is further configured to determine to include the second resource query in a multicast group of the MGID for the first resource query or a unicast group of the MGID for the first resource query based on at least the first sPRID and the second sPRID.

9. The device of claim 8, wherein the processor is further configured to determine that the response to the first resource query satisfies the second resource query using the similarity between the first resource query and the second resource query by:

extracting, from the second sPRID, a query operation and a query value; and determining that the query operation and the query value are satisfied by the response to the first resource query.

10. A method for processing a query for a resource, the method comprising:

receiving a first resource query directed to the resource, wherein the first resource query comprises a first structured proxy rule identifier (sPRID);

receiving a second resource query directed to the resource, wherein the second resource query comprises a second sPRID;

determining a similarity between the first resource query and the second resource query using a portion of the first sPRID and a portion of the second sPRID;

determining that a response to the first resource query satisfies the second resource query using the similarity between the first resource query and the second resource query; and multicasting the response to the first resource query.

11. The method of claim 10, further comprising receiving the response to the first resource query.

12. The method of claim 10, further comprising generating a multicast group identifier (MGID) for the first resource query based on a uniform resource identifier (URI) for the first resource query and a query type of the first resource query.

13. The method of claim 12, further comprising determining the similarity between the first resource query and the second resource query using the portion of the first sPRID and the portion of the second sPRID by determining that the MGID for the first resource query and the MGID for the second resource query are the same.

14. The method of claim 12, further comprising extracting, from the first sPRID, the URI for the first resource query and the query type of the first resource query.

15. The method of claim 12, further comprising determining to include the second resource query in a multicast group of the MGID for the first resource query or a unicast group of the MGID for the first resource query based on at least the first sPRID and the second sPRID.

16. The method of claim 15, further comprising determining that the response to the first resource query satisfies the second resource query using the similarity between the first resource query and the second resource query by:

extracting, from the second sPRID, a query operation and a query value; and determining that the query operation and the query value are satisfied by the response to the first resource query.

* * * * *